(12) United States Patent
Wieder et al.

(10) Patent No.: US 12,016,497 B2
(45) Date of Patent: Jun. 25, 2024

(54) MULTI-MEAL COLD STORAGE AND COOKING APPLIANCE AND SYSTEM

(71) Applicant: Counter Intuitive Cooking, Inc., Eldersburg, MD (US)

(72) Inventors: Maxwell Henry Wieder, Eldersburg, MD (US); Edward David Holzinger, Columbia, MD (US); Clayton James, Eldersburg, MD (US)

(73) Assignee: Counter Intuitive Cooking, Inc., Eldersburg, MD (US)

( * ) Notice: Subject to any disclaimer, the term of this patent is extended or adjusted under 35 U.S.C. 154(b) by 0 days.

(21) Appl. No.: 17/688,885

(22) Filed: Mar. 7, 2022

(65) Prior Publication Data
US 2022/0192428 A1    Jun. 23, 2022

Related U.S. Application Data

(63) Continuation of application No. 17/333,705, filed on May 28, 2021, now Pat. No. 11,266,273, which is a
(Continued)

(51) Int. Cl.
*A47J 44/00* (2006.01)
*A47J 36/32* (2006.01)
*F25D 25/04* (2006.01)

(52) U.S. Cl.
CPC .............. *A47J 44/00* (2013.01); *A47J 36/32* (2013.01); *F25D 25/04* (2013.01); *F25D 2400/02* (2013.01); *F25D 2700/06* (2013.01)

(58) Field of Classification Search
CPC . A47J 44/00; A47J 36/32; F25D 25/04; F25D 2400/02; F25D 2700/06
(Continued)

(56) References Cited

U.S. PATENT DOCUMENTS

| 4,133,995 A | 1/1979 | Buck |
| 6,244,165 B1 * | 6/2001 | Trombley ............... F25D 23/12 219/679 |

(Continued)

FOREIGN PATENT DOCUMENTS

| CN | 87202398 U | 11/1987 |
| CN | 1482869 A | 3/2004 |

(Continued)

OTHER PUBLICATIONS

International Search Report and Written Opinion issued in Application No. PCT/US2020/018305, dated May 7, 2020.
(Continued)

*Primary Examiner* — Steve S Tanenbaum
(74) *Attorney, Agent, or Firm* — Arnall Golden Gregory LLP

(57) ABSTRACT

The present disclosure relates to an appliance. In one embodiment, the appliance has an enclosed structure which includes a first portion configured to receive one or more meal cartridges, and store and preserve the meal cartridges at a selected temperature range; a second portion; and transfer mechanism configured to transfer at least one meal cartridge in the first portion to the second portion within the enclosed structure in response to a command input for cooking the at least one meal cartridge. The second portion is configured to accept the at least one meal cartridge, receive a cooking instruction command including a cooking duration and temperature determined for the at least one meal cartridge, and cook the at least one meal cartridge based upon the cooking duration and temperature.

15 Claims, 12 Drawing Sheets

Related U.S. Application Data continuation of application No. PCT/US2020/018305, filed on Feb. 14, 2020.

(60) Provisional application No. 62/806,298, filed on Feb. 15, 2019.

(58) Field of Classification Search
USPC .......................................................... 99/325
See application file for complete search history.

(56) References Cited

U.S. PATENT DOCUMENTS

| | | | |
|---|---|---|---|
| 6,250,210 B1 | 6/2001 | Moreth | |
| 6,550,632 B2 | 4/2003 | Gubbini et al. | |
| 2003/0139843 A1* | 7/2003 | Hu | H05B 6/688 700/211 |
| 2005/0193901 A1 | 9/2005 | Buehler | |
| 2006/0191885 A1* | 8/2006 | Near | G06Q 10/0631 219/214 |
| 2011/0022211 A1* | 1/2011 | McIntyre | G05B 15/02 700/108 |
| 2015/0272371 A1 | 10/2015 | Gagnon | |
| 2016/0338545 A1* | 11/2016 | Shah | A47J 31/52 |
| 2016/0379434 A1 | 12/2016 | Huang | |
| 2017/0143151 A1 | 5/2017 | Lemberg et al. | |
| 2018/0249861 A1 | 9/2018 | Hiatt et al. | |

FOREIGN PATENT DOCUMENTS

| | | | |
|---|---|---|---|
| CN | 1691890 | A | 11/2005 |
| CN | 2917500 | Y | 7/2007 |
| CN | 202868783 | U | 4/2013 |
| CN | 104757867 | A | 7/2015 |
| CN | 105459127 | A | 4/2016 |
| CN | 107495825 | A * | 12/2017 |
| CN | 107631532 | A | 1/2018 |
| CN | 107633607 | A | 1/2018 |
| CN | 109044123 | A * | 12/2018 |
| JP | S53-20119 | U | 2/1978 |
| JP | S58-188502 | U | 12/1983 |
| JP | H7-229675 | | 8/1995 |
| JP | 2001-188959 | | 7/2001 |
| JP | 2002-156117 | | 5/2002 |
| JP | 2008-22908 | | 2/2008 |
| JP | 2014-43973 | | 3/2014 |
| JP | 2015-203542 | | 11/2015 |
| JP | 2018-534514 | | 11/2018 |
| WO | WO-2014/134717 | A1 | 9/2014 |
| WO | WO-2017/044876 | | 3/2017 |
| WO | WO-2018/089946 | A1 | 5/2018 |
| WO | WO-2018/136777 | A1 | 7/2018 |

OTHER PUBLICATIONS

Extended European Search Report and Opinion issued in EP20755424.7, dated Oct. 28, 2022.

Chinese Search Report issued with First Office Action in CN Application No.: 202080014269.9, issued Sep. 27, 2023, with English translation.

Japanese Office Action in JP Application No.: 2021-547797, issued Feb. 6, 2024, with English translation.

* cited by examiner

MULTI-MEAL COLD STORAGE AND COOKING APPLIANCE AND SYSTEM

CROSS-REFERENCE TO RELATED APPLICATION

This application is a Continuation of U.S. patent application Ser. No. 17/333,705 filed May 28, 2021, granted as U.S. Pat. No. 11,266,273, which is a Bypass Continuation Application of PCT Application No. PCT/US2020/018305 filed Feb. 14, 2020, which claims priority to U.S. Provisional Patent Application No. 62/806,298, filed Feb. 15, 2019, the contents of each of which are herein incorporated by reference.

FIELD OF TECHNOLOGY

The present disclosure generally relates to an appliance, and more particularly relates to a combination smart kitchen appliance comprising a multi-item/meal cold storage and hot cooking area with automatic transfer from the cold storage to the hot cooking area via, e.g., a command from Internet Of Things (IOT) connectivity.

BACKGROUND

Preparing and cooking a meal can be time consuming and often requires constant human intervention and attention. Certain current smart kitchen appliances may cook one meal and use sous vide style of cooking. An example of a self-contained oven design may keep a singular meal cold using a water bath that is temperature controlled. Upon receiving a command to cook the meal, the water bath may be heated to a set time and temperature according to a desired doneness of the meal. For some smart cooking appliances, it may still require a person to take a food item from a refrigerator, move it to a hot plate or cooking device, and look up and set a cooking time and temperature.

Accordingly, it is desirable to have an appliance that is configured to cook multiple items without human intervention, such that a person need not be home or in the kitchen to select a meal from cold storage and cook it, look up cook times and temperatures for different food products, or spend time preparing and cooking one or more meals.

SUMMARY

The present disclosure generally discloses an appliance having an enclosed structure. The enclose structure may comprise a first portion configured to receive one or more meal cartridges, and store and preserve the meal cartridges at a selected temperature range. The enclosed structure may also comprise a second portion and a transfer mechanism configured to transfer at least one meal cartridge from the first portion to the second portion within the enclosed structure in response to a command input for cooking the at least one meal cartridge. The second portion may be configured to: accept the at least one meal cartridge, receive a cooking instruction command wherein the cooking instruction command comprises a cooking duration and temperature determined for the at least one meal cartridge, and cook the at least one meal cartridge based upon the cooking duration and temperature.

In one embodiment, the first portion may comprise a plurality of removable shelves configured to store the meal cartridges. The selected temperature range for the first portion may be from about −10 degrees Fahrenheit to about 40 degrees Fahrenheit. The second portion may be configured to heat up to about 1000 degrees Fahrenheit.

In a further embodiment, the disclosed appliance may comprise modules configured to detect: a cooking status of the at least one meal cartridge in the second portion, a presence or absence of any meal cartridge on each shelve of the first portion, an indication of a network connectivity status, an operating status of the appliance, or an operating status of the second portion.

In yet another embodiment, the disclosed appliance may comprise an interface configured to display one or more of: the cooking status of the at least one meal cartridge in the second portion, the presence or absence of any meal cartridge on each shelve of the first portion, the indication of the internet connectivity status, the operating status of the appliance, and the operating status of the second portion.

Moreover, the interface of the appliance may comprise at least one button selected from a reset button, a cancel button, a pause/resume button, a reheat button, and a sync button of the appliance.

The transfer mechanism may be configured to sequentially transfer two or more meal cartridges from the first portion to the second portion within the enclosed structure in response to receiving the cooking instruction commands for cooking the two or more meal cartridges. The second portion may be configured to receive a cooking sequence of the two or more meal cartridges, and accept and cook the two or more meal cartridges in accordance with the cooking sequence and the cooking duration and temperature determined for each of the two or more meal cartridges.

The disclosed appliance may further comprise means for opening the at least one meal cartridge prior to transferring the at least one meal cartridge from the first portion to the second portion.

In addition, each of the meal cartridges may be associated with a unique identifier, and the appliance may further comprise a module for detecting the unique identifier associated with each meal cartridge when the first portion receives each meal cartridge.

In one embodiment, the second portion may be configured to detect the unique identifier associated with each meal cartridge when the second portion receives each meal cartridge from the first portion.

The disclosed appliance may further comprise insulation means for thermally insulating the first portion from the second portion of the appliance. The second portion may comprise a convection heater, and a fan assembly. The cooking temperature and cooking duration may be controlled by an oven that is controlled by at least one processor of the appliance. In one embodiment, the oven may comprise a browning element configured to warm the at least one meal cartridge upon detecting that the at least one meal cartridge has not been taken out of the second portion after being cooked.

In yet another embodiment, the first portion and the second portion of the appliance may be separated by a divider comprising at least one of a door, a slider, or a roller. The divider may further comprise guides configured to engage the at least one meal cartridge when transferring the at least one meal cartridge from the first portion to the second portion. The second portion may comprise an elevator tray with opening means for extracting the at least one meal cartridge from the first portion. The elevator tray may be further configured to select the at least one meal cartridge chosen by the cooking instruction command by moving vertically within the second portion and transferring the at least one meal cartridge to an oven contained in the second portion, wherein the elevator tray is configured to form the bottom of the oven.

In another embodiment, the first portion may comprise a compressor and an oven, and the appliance comprises a vent from the compressor to the oven. The compressor may generate heat as it operates and that heat is vented to the oven via the vent to maintain the oven at a preselected temperature. The first portion may further comprise at least one of a camera, an RF ID tag, or barcode reader device. The second portion may further comprise means for detecting a fire within the second portion.

Furthermore, the second portion may comprise means for disposing of waste from the at least one meal cartridge. The interface may be configured to interact with third party applications via application programming interface (API) synch or account linking. The second portion may comprise at least one of an oven, a pressure cooker, a microwave, or a steam oven. In one embodiment, the second portion may further comprise a plurality of sections configured to independently cook different ingredients of a meal at different temperatures.

The above simplified summary of example aspects serves to provide a basic understanding of the present disclosure. This summary is not an extensive overview of all contemplated aspects, and is intended to neither identify key or critical elements of all aspects nor delineate or otherwise limit the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
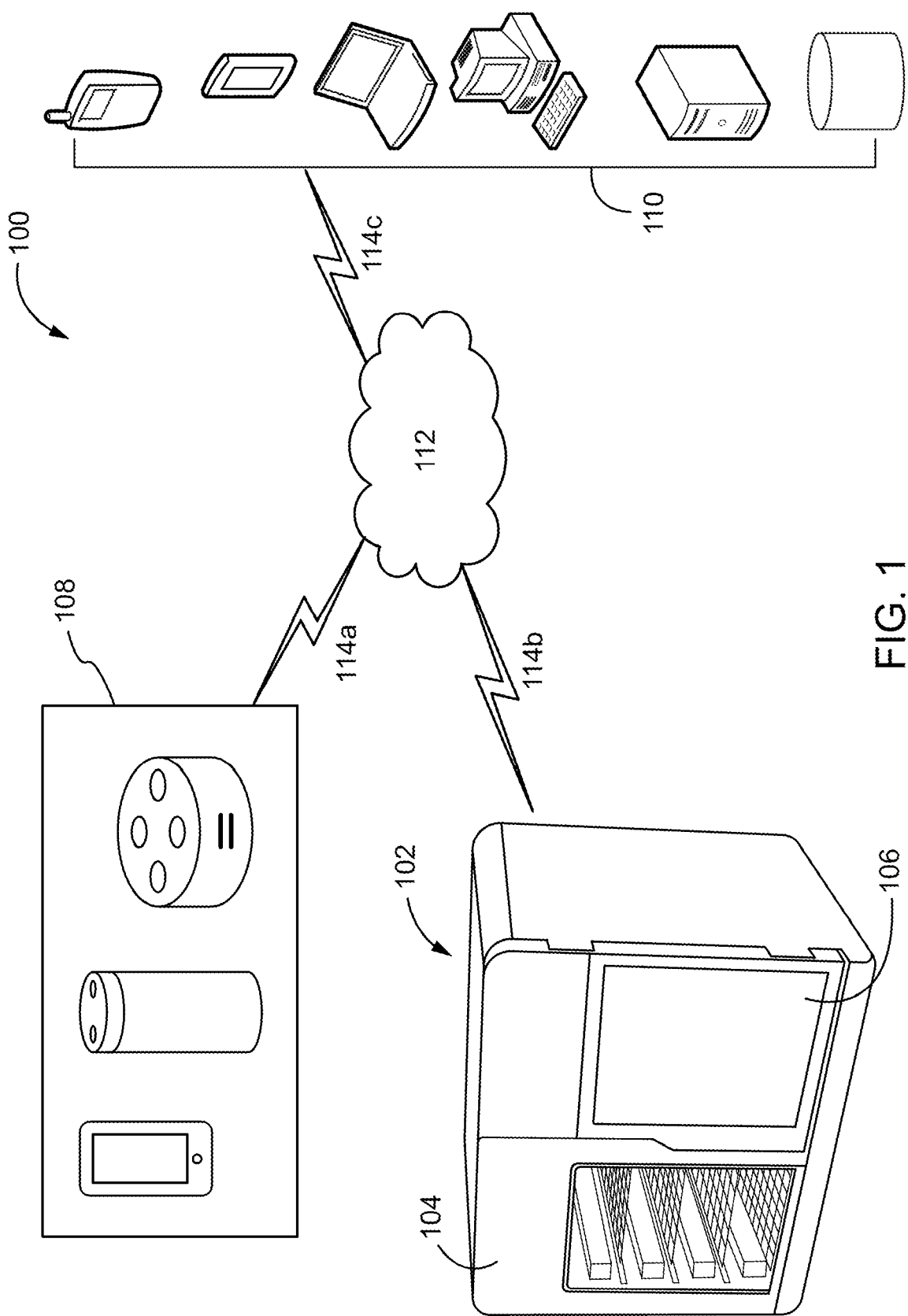
FIG. 1 illustrates a system deployed in a communication network for controlling a smart appliance having a multi-item/meal cold storage and hot cooking area with automatic transfer from the cold storage to the hot cooking area in response to a cooking instruction command, according to an exemplary aspect of present disclosure.

Various aspects of examples of embodiments will be described with reference to the drawings, wherein like reference numerals are used to refer to like elements throughout. In the following description, for purposes of explanation, numerous specific details are set forth in order to promote a thorough understanding of one or more aspects of the embodiments described herein. It may be evident in some or all instances, however, that any aspects described below can be practiced without adopting the specific design details described below and one of skill in the art would understand how to depart from the specific examples described below.

According to an embodiment, FIG. 1 generally illustrates a system 100 that may be implemented for refrigerating and storing multiple premade meals, and cooking a selected premade meal without requiring human intervention. Unlike aforementioned prior approaches, a smart appliance 102 of system 100 may allow a user to have multiple choices with respect to a meal the user wishes to cook. Not only do premade meals used in connection with smart appliance 102 eliminate the time spent preparing food, these meals may also allow the user options and the ability to use smart appliance 102 multiple times before having to restock it. As will be described fully below, system 100 allows the user to use real world data (e.g., traffic, travel time, sports events, etc.) to have the food ready at a potentially dynamic time. For example, the user may desire to have the food ready when the user gets home from work based on traffic or around half time of the Super Bowl. For example, a dynamic time may be achieved when a user sends a cooking instruction command to the appliance when leaving work. The appliance may communicate, for example, with a user's smartphone or automobile GPS to automatically adjust the cooking time so that the user's desired food item is prepared upon arrival at home. That dynamic cooking time can be adjusted, for example, by altering a temperature set point in the oven, or replacing the meal back into the cooling portion depending on the estimated length of time until the user will want to consume the meal. The dynamic cooking time can increase or decrease the cooking from the initially estimated time. For example, if a user wishes to eat a meal at 6 PM and leaves work at 5:30 PM with a typical commute of 30 minutes and a initially-estimated cook time of 25 minutes, the device may wait until 5:30 to begin cooking the meal. If that user encounters a delay that would cause the user to be 15 minutes late, the device can dynamically increase the cooking time so that it is ready to eat when the user arrives home. The device can also assess variable such as traffic, travel time, a delay to arrive, etc., to determine that the meal will be best prepared by using the initially estimated time and then maintaining an oven setting to keep the food warm until the user is ready to consume it.

In one aspect, system 100 may be configured to utilize one click reorders and notify the user when the user should reorder based on how many premade meals the user has used. The user may also enable an auto-reorder function, so the user needs not to be involved.

As shown in FIG. 1, smart appliance 102 of system 100 may comprise a conjoined freezer portion 104 and an oven portion 106 within an enclosed structure (e.g., an appliance housing structure). Oven portion 106 may comprise a plurality of sections that may be independently heated to differing temperatures and for differing cooking times, such that the oven portion may independently cook different ingredients of a meal at different temperatures and for different times. These sections may be oriented vertically relative to one another (e.g., on different shelves) or in a horizontal orientation such that a single shelf may contain several partitioned sections capable of maintaining differing temperatures. In one embodiment, the freezer portion 104 may define a cold food storage area having, e.g., multiple trays or shelves of food storage, on one side within the housing of smart appliance 102. The freezer portion 104 may be configured to receive one or more meal cartridges, and store and preserve these meal cartridges at a selected temperature range. For example, the user may manually load the freezer portion 104 by placing multiple premade meal cartridges on respective food storage shelves. These meal cartridges may have uniform or different sizes. Each meal cartridge may be associated with a unique identifier. Smart appliance 102 may contain a detector to read and/or identify the unique identifier. For example, an onboard barcode scanner of smart appliance 102 may be configured to detect the unique identifier associated with each meal cartridge upon its insertion into the freezer portion 104. Some embodiments may use a camera, radio frequency identification (RFID) reader, or the like to detect the meal cartridge selected by the user. This may trigger an upload of food data to, e.g., a connected cloud system (e.g., computing server system 110) and corresponding user profile. The user may use a suitable computing device 108 (e.g., a smart device or connected smart home device) to command smart appliance 102 to cook one or more of the available meal cartridges. In some embodiments, a user may select a serving size (e.g., number of intended diners) and the appliance may choose to cook one or more selected food cartridges depending on that selection and they dynamic time. For example, a user may communicate that two diners would like a pasta dish and the cooling portion may choose to cook two pasta meal cartridges or, instead, choose to cook one larger meal cartridge so that the cooking time and cooked meal cartridge quality is optimized.

In one aspect, smart appliance 102 and various computing devices may be configured to communicate with computing server system 110 via a communication network 112 using suitable network connections and protocols 114a, 114b, and 114c. A communication network (e.g., communication network 112) may refer to a geographically distributed collection of computing devices or data points interconnected by communication links and segments for transporting signals and data therebetween. A protocol (e.g., protocols 114a, 114b, and 114c) may refer to a set of rules defining how computing devices and networks may interact with each other, such as frame relay, internet protocol (IP), transmission control protocol (TCP), user datagram protocol (UDP), hypertext transfer protocol (HTTP). Many types of communication networks are available, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network.

For example, communication network 112 may be a LAN configured to connect each, any, and all computing devices and smart appliance 102 deployed within a user's home over dedicated private communications links. Communication network 112 may be a WAN configured to connect computing devices deployed within the user's home and other geographically dispersed computing devices and networks over long-distance communications links, such as common carrier telephone lines, optical light paths, synchronous optical networks (SONET), or synchronous digital hierarchy (SDH) links. The Internet may be used to connect disparate devices and networks throughout the world, providing global communication among nodes (a node of an Internet has an IP address) on various networks. These nodes may communicate over the communication network 112 by exchanging discrete frames or packets of data according to protocols 114a-114c, such as TCP/IP. Communication network 112 may be further interconnected by an intermediate network node, such as a router and/or gateway device, to extend the effective size of each network.

In another aspect, system 100 may employ a cloud-based communication network 112 for providing computing services using shared resources. Cloud computing may generally include Internet-based computing in which computing resources are dynamically provisioned and allocated to each connected computing device or other devices on-demand, from a collection of resources available via the network or the cloud. Cloud computing resources may include any type of resource, such as computing, storage, and networking. For instance, resources may include service devices (firewalls, deep packet inspectors, traffic monitors, load balancers, etc.), compute/processing devices (servers, CPUs, GPUs, random access memory, caches, etc.), and storage devices (e.g., network attached storages, storage area network devices, hard disk drives, solid-state devices, etc.). In addition, such resources may be used to support virtual networks, virtual machines, databases, applications, etc.

Cloud computing resources accessible via communication network 112 may include a private cloud, a public cloud, and/or a hybrid cloud. For example, a private cloud may be a cloud infrastructure operated by an enterprise for use by the enterprise, while a public cloud may refer to a cloud infrastructure that provides services and resources over a network for public use. In a hybrid cloud computing environment which uses a mix of on-premises, private cloud and third-party, public cloud services with orchestration between the two platforms, data and applications may move between private and public clouds for greater flexibility and more deployment options.

In accordance with an aspect, computing server system 110 of the present disclosure may be cloud-based and may comprise at least one of personal computers, servers, server farms, laptops, tablets, mobile devices, smart phones, smart watches, fitness tracker devices, cellular devices, gaming devices, media players, network enabled printers, routers, wireless access points, network appliances, storage systems, gateway devices, smart home devices, virtual or augmented reality devices, or any other suitable devices that are deployed in the same or different communication network of smart appliance 102 and computing device 108. As will be described fully below, computing server system 110 may be configured to provide functionalities for any connected devices such as sharing data or provisioning resources among multiple client devices, or performing computations for each connected client device.

As will be described fully below, upon receipt of a command over the communication network 112, a partition (not shown in FIG. 1) between the freezer portion 104 and oven portion 106 inside smart appliance 102 may be configured to open from the freezer portion 104 to an elevator shaft (not shown) which may be located below an oven in the oven portion 106. An oven bottom may be configured to move down the elevator shaft to an appropriate shelf level of the freezer portion 104 of a user selected food item/meal corresponding to the received command. In one embodiment, transfer mechanism (e.g., a pusher or a puller) in the freezer portion 104 may be configured to slide the selected food item onto the oven bottom in the elevator shaft. Alternatively, the transfer mechanism (e.g., the pusher or the puller) may be configured to be attached to the elevator. The oven bottom may be configured to move up to reseal the oven and start cooking the food item positioned in the oven. Simultaneously with the oven bottom resealing the oven, the partition between the freezer and oven portions 104, 106 may be configured to reseal the freezer portion 104. The cook time and temperature of the food item in the oven may be determined and set based on information retrieved from a database, such as a manufacture database or a proprietary database, online associated with the food item. The user may be notified of the different states of the food item (e.g., prepare, cooking, ready, error, etc.). Upon detecting that the food item has been cooked to a desired state, the oven bottom may be configured to move down and wait for the user to pull the food item out through a door of the oven portion 106. During this time, a browning element in the oven portion 106 may be used as a warmer to keep the food item warm.

In some embodiments, a transfer mechanism may hold a meal cartridge by the top and convey the meal cartridge to an oven located at the bottom of the unit. In some embodiments, the transfer mechanism may encompass the meal cartridge and itself act as the housing of an oven portion. In some embodiments, a transfer mechanism may transport a meal cartridge connected to a freezer portion. Some embodiments may include heating portions that are not ovens. In some embodiments, an appliance can comprise a heating portion that comprises an oven, an air fryer, a broiler, a sous vide device, a pressure cooker, a steamer, and the like. In some embodiments, an oven, an air fryer, a broiler, a sous vide device, a pressure cooker, a steamer, and the like may be incorporated into a unitary structure or may be one or more different structures to which the transfer mechanism can convey one or more meal cartridges. In some embodiments, a transfer mechanism and/or elevator shaft may be positioned within the heating portion. For example, in one embodiment, an appliance can comprise a cooling portion and a heating portion and the heating portion comprises a transfer mechanism comprising an elevator shaft.

Figure 2:
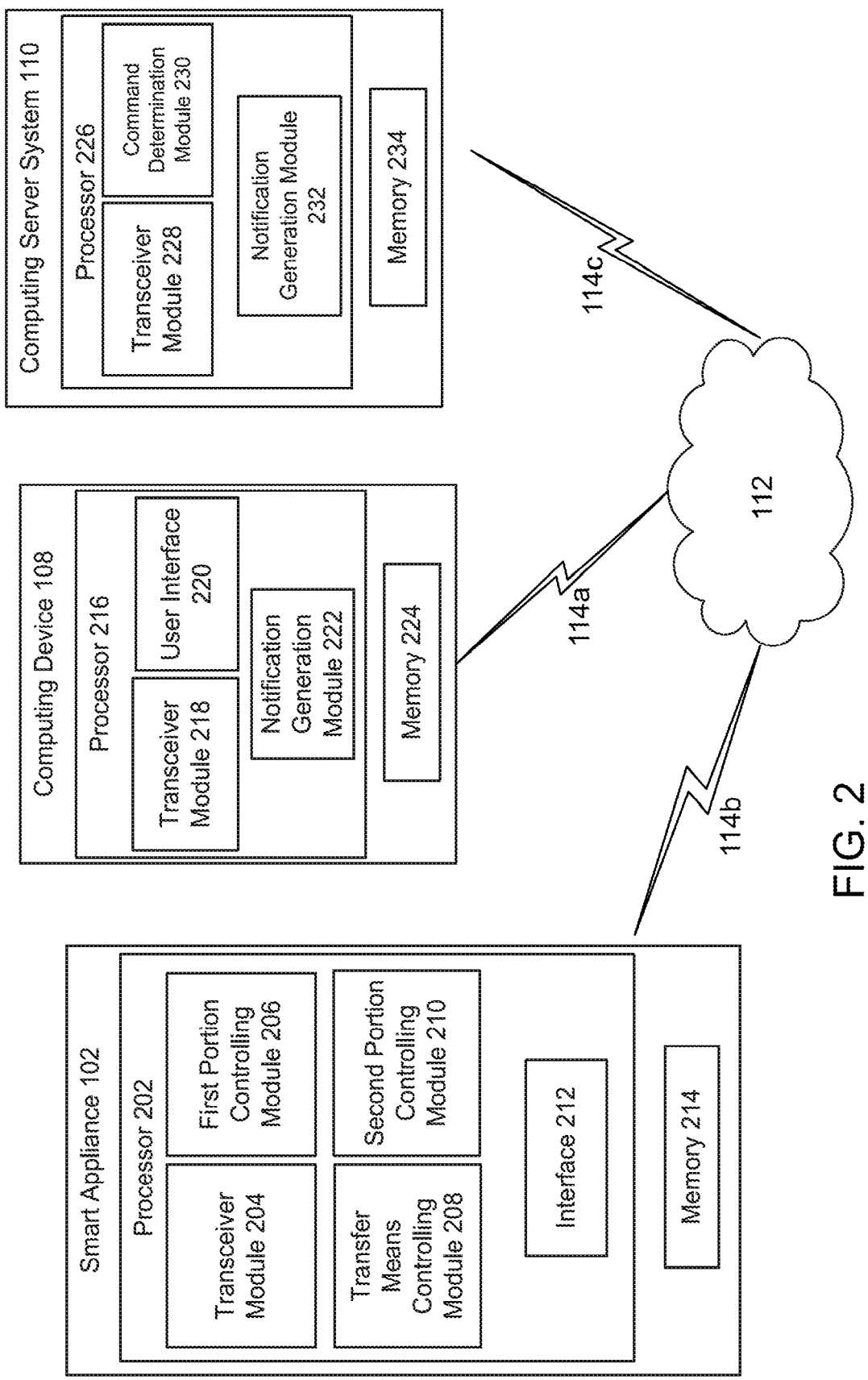
FIG. 2 illustrates a simplified diagram of the system of FIG. 1, according to an exemplary aspect.

Referring to FIG. 2, smart appliance 102 of system 100 may include at least one processor 202 configured to control and execute a plurality of modules including a transceiver module 204, a first portion controlling module 206, a transfer mechanism controlling module 208, a second portion controlling module 210, and an interface 212. The term "module" as used herein refers to a real-world device, component, or arrangement of components and circuitries implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. Each module may be realized in a variety of suitable configurations, and should not be limited to any example implementation exemplified herein.

Memory 214, which is coupled to the processor 202, may be configured to store at least a portion of information obtained by smart appliance 102. In one aspect, memory 214 may be a non-transitory machine readable medium configured to store at least one set of data structures or instructions (e.g., software) embodying or utilized by at least one of the techniques or functions described herein. It should be appreciated that the term "non-transitory machine readable medium" may include a single medium or multiple media (e.g., a centralized or distributed database, and/or associated caches) configured to store the at least one instruction. The term "machine readable medium" may include any medium that is capable of storing, encoding, or carrying instructions for execution by all modules of smart appliance 102 and that cause these modules to perform at least one of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. These components can be integrated with systems and methods of the present application to achieve devices and methods capable of solving problems associated with prior art ovens. By incorporating and integrating computing components with the freezer and heating elements as set forth herein, for example, this provides a fully automated cooking system that can be configured and altered in real-time and on a dynamic basis based on the user's conditions (e.g., traffic, distance from work, time until ready to eat, etc.) to produce a optimally cooked meal without user intervention or proximity to the device.

In accordance with aspects of the present application, transceiver module 204 may be configured by processor 202 of smart appliance 102 to communicate various information and data with computing device 108 (e.g., a smart device or connected smart home device) and computing server system 106. For example, after a user inserts at least one meal cartridge into the freezer portion 104 of smart appliance 102, transceiver module 204 may be configured to transmit identifying information of the inserted meal cartridge to computing server system 106, such that cooking temperature and duration of the meal cartridge may be obtained by computing server system 106 and transmitted to the transceiver module 204. Further, transceiver module 204 may be configured to receive signals indicating the operating status of the smart appliance 102 and different states of the food item being cooked by the oven portion 106, and transmit, e.g., notifications to computing server system 106 when the food item is ready.

Further, a first portion controlling module 206 may be configured by processor 202 of smart appliance 102 to control various functionalities of freezer portion 104 which comprises at least one removable shelf for storing premade meal cartridges that may be available in uniform or different sizes and package shapes. In some embodiments, a user may prepare her own custom meal cartridges to load into the appliance. The freezer portion 104 can also comprise one or more doors for accessing or inserting one or more meal cartridges on the one or more removable shelves. Upon detecting that at least one meal cartridge has been inserted and placed on a removable shelf, module 106 may be configured to refrigerate (and/or freeze) and preserve the meal cartridge at a selected temperature range. One example selected temperature range may be from about −10 degrees Fahrenheit to about 55 degrees Fahrenheit. In accordance with one aspect of the present disclosure, a meal cartridge may be associated with a unique identifier, and module 206 may include a detector configured to detect the unique identifier associated with each meal cartridge when the freezer portion 104 receives each meal cartridge. An example unique identifier may comprise at least one of: a Quick Response (QR), a barcode communication code, a near field communication code, logo recognition, visual recognition (e.g., using a camera), digicode, and a Radio Frequency Identification (RFID) communication code. Freezer portion 104 may be configured to have a detector such as an identification scanning module or device, such as a camera, an RF ID tag, barcode reader device, or the like to obtain the unique identifier of each meal cartridge upon its insertion. A freezer portion 104 may further refer to any portion of the appliance capable of cooling. In some embodiments, a freezer portion (i.e., cooling portion) 104 may comprise multiple shelves. In some embodiments, the multiple shelves may be cooled to different temperatures. In certain embodiments, one or more shelves may be cooled to a temperature below freezing while one or more shelves are cooled to a temperature above freezing (e.g., refrigerated). As such, as used in certain embodiments herein, the term "freezer portion" can be used interchangeably with "cooling portion" because the temperature of that range is configurable depending upon a user's desired storage condition. Certain embodiments may comprise individually isolated shelves that allow for each shelf to be held at a different or same temperature.

In response to receiving a command input from computing server system 110 for cooking a meal cartridge in freezer portion 104 (e.g., after receiving a user's cooking instruction command), a transfer mechanism controlling module 208 may be configured by processor 202 of smart appliance 102 to transfer one or more meal cartridges from freezer portion 104 to oven portion 106. For example, after transceiver module 204 receives cooking temperature and duration of the meal cartridge in accordance with the command input, module 208 may be configured to open a divider (e.g., a door, a slider or a roller) between the freezer portion 104 and the oven portion 106. Such divider may comprise guides (such as slots that guide the edges of the meal cartridge) configured to engage the selected meal cartridge when transferring it from the freezer portion 104 to the oven portion 106. It should be appreciated that proper insulation (e.g., aerogel) may be implemented to thermally insulate the freezer portion 104 from the oven portion 106 of smart appliance 102 and ensure both portions operate at the appropriate temperature ranges during use. Certain embodiments may comprise insulation between one or more shelves housed in a freezer portion. Thereafter, the selected meal cartridge may be opened prior to its transfer to the oven portion 106. For example, flash film may be used for foods packaged in the meal cartridge that needs to be exposed to a browning element of the oven portion 106 and aluminum overlay may be used for foods that need steaming After the top package surface of the meal cartridge is slit open by opening means, e.g., knives implemented within smart appliance 102, an elevator tray within the oven portion 106 may be configured to move down vertically and stop at the freezer shelf height of the meal cartridge indicated in the cooking instruction command and extract it from the freezer portion 104. Such extraction may use either pull or push force. In one embodiment, a toothed belt and fingers may be implemented to push the meal cartridge onto the elevator tray which also forms the bottom of an oven enclosure of the oven portion 106. Thereafter, the elevator tray may be configured to move to seal the oven portion 106, and a second portion controlling module 210 may be configured by processor 202 of smart appliance 102 to start cooking the meal cartridge in the oven portion 106 in accordance with the cooking instruction command. In some embodiments, the elevator tray moves up vertically so that the bottom of the elevator tray forms the bottom of the oven enclosure of the oven portion 106, and in some embodiments, the elevator tray may move downward to form the top of an oven portion during cooking. In some embodiments, the oven portion may be considered only an aspect of a second portion of the device (e.g., having a first portion comprising a cooling portion, and a second portion comprising an oven portion). The transfer mechanism (e.g., the pusher or the puller) may be configured to be attached to the elevator or in the elevator shaft.

In one aspect, the oven portion 106 may comprise an oven configured to heat up to about 1000 degrees Fahrenheit (though it may operate at ranges between such as between about 100 and 500 degrees Fahrenheit, between about 100 and 750 degrees Fahrenheit, between about 250 and 750 degrees Fahrenheit, between about 100 and 1000 degrees Fahrenheit, and ranges therebetween), and a browning element configured to warm, cook, broil, and/or sear a cooked meal cartridge that has not been taken out by the user immediately for consumption. In some embodiments, the oven portion may partially heat and/or cook a meal cartridge and then complete the cooking (e.g., by browning) depending on the determined dynamic cooking time. The second portion controlling module 210 may be configured to detect the unique identifier associated with each meal cartridge when it moves onto the elevator tray of the oven portion 106 or is otherwise conveyed by the elevator tray as set forth herein. After identifying the meal cartridge, module 210 may start a timer and control the oven to cook the meal cartridge at a cooking duration and temperature specified in the cooking instruction command Once the timer is done, module 210 may configure the elevator tray to move along its elevator shaft. Accordingly, transceiver module 204 may be configured to send a signal to computing server system 110 to indicate that the food is ready. Meanwhile, the browning element may be configured to start warming the food until the user opens a door to the oven portion 106 to access the cook meal cartridge. In one aspect, module 210 may be configured to dispose waste from the meal cartridge being cooked and detect fire in the oven portion 106, such as by including a chute or compartment to guide the waste outside the appliance or into a removable compartment that can be periodically emptied by a user.

In one embodiment, the oven portion 106 may be configured to detect a fire within the oven chamber using any suitable technologies. For example, one or more sensors (e.g., a camera using vision technology, a built-in thermometer, a smoke detector, a fire sensor, a heat detector, a combined heat and smoke detector, a vapor sensor, a gas sensor, or any suitable sensor) may be installed in the oven portion 106 and controlled by processor 202 for detecting, e.g., rapid uncontrolled heat increase, abnormal gas/smoke accumulation, or other emergency condition. An alert or a signal may be generated by the processor 202 and transmitted to the computing device 108 and/or remote computing server system 110 in response to detecting a fire in the oven portion 106, such that the user may receive a text message, e-mail, automated telephone call, or the like immediately.

In an embodiment, a number of cooking instruction commands may be received by transceiver module 204 of smart appliance 102. As a result, transfer mechanism controlling module 208 may be configured by processor 202 to sequentially transfer two or more meal cartridges from the freezer portion 104 to the oven portion 106. Accordingly, second portion controlling module 210 may be configured to receive a cooking sequence of multiple meal cartridges, and accept and cook multiple meal cartridges in accordance with the cooking sequence and the cooking duration and temperature determined for each of the multiple meal cartridges.

In accordance with aspects of the present disclosure, smart appliance 102 also comprises sensors or modules configured to detect: a cooking status of the at least one meal cartridge in the second portion, a presence or absence of any meal cartridge on each shelf of the first portion, an indication of a network connectivity status, or an operating status of the appliance. Accordingly, an interface 212 of smart appliance 102 may be configured to display one or more of: the cooking status of a meal cartridge in the oven portion 106, the presence or absence of any meal cartridge on each shelf of the freezer portion 104, the indication of the communication network connectivity status, or the operating status of smart appliance 102. For example, the interface 212 may comprise a reset button, a cancel button, a pause/resume button, a reheat button, and a sync button of smart appliance 102. Further, the interface 212 may be configured to interact with third party companies via application programming interface (API) synch or account linking, thereby facilitating integration with smart home services including, but not limited to, Alexa, Siri, Microsoft services (e.g., Cortana) and Google services (e.g., Google Assistant), Samsung services (e.g., Bixby) and the like. The interface 212 may also be configured to interact with any suitable diet and exercise smartphone apps and websites such as MyFitnessPal, Fitbit and the like.

While the present disclosure has been described with respect to a limited number of embodiments, those skilled in the art will appreciate numerous modifications and variation therefrom. For example, a second portion comprising an oven portion may also (or instead) comprise a pressure cooker, slow cooker, infrared cooker, oil fryer, a microwave, a steam oven, a sous vide, a smoker, air fryer or some appropriate closed vessel systems. Some embodiments may not comprise a sous vide. Some embodiments may not comprise an oil fryer. Some embodiments may not comprise a slow cooker. Some embodiments may not comprise a pressure cooker. Some embodiments may not comprise an infrared cooker. Some embodiments may not comprise a microwave. Some embodiments may not comprise a steam oven. Some embodiments may not comprise an air fryer. Some embodiments may comprise combinations of these heating devices. For instance, some embodiments may include cooking a meal cartridge in a sous vide portion at a temperature that produces steam and use that steam to steam a separate meal cartridge. In some embodiments, a second portion may comprise a crock pot that heats a meal cartridge, wherein the crock pot may be insulated and removable from the appliance, such that a user may transport a cooked meal cartridge while maintaining its temperature. In some embodiments, the appliance may alter cooking times and conditions based on its location, e.g., by considering elevation, humidity, ambient temperature, etc. Some embodiments may also allow for configuration of the cooking instruction command, such that a user may define specific food preferences. For instance, a user that likes al dente pasta may choose to have her pasta cooked to that extent. In instances where a user prefers a rare steak (or medium, medium rare, well done, etc.), the user can select that preference in the cooking instruction command and the appliance will cook the meal cartridge to that desired condition. The appliance may comprise machine learning (such as artificial intelligence) so that a user may provide feedback of the appliance's satisfaction of the user's cooking preference via a connected device and the appliance can adapt to those preferences and further modify its operation to suit those preferences.

As further shown in FIG. 2, computing device 108 of system 100 may include at least one processor 216 configured to control and execute a plurality of modules including a transceiver module 218, a user interface 220, and a notification generation module 222. Memory 224 (similar to memory 214), which is coupled to the processor 216, may be configured to store at least a portion of information obtained by computing device 108 and data structures or instructions (e.g., software) embodying or utilized by at least one of the techniques or functions described herein. As described above, computing device 108 may be in the form of a mobile smart device or a connected smart home device configured to allow a user to command smart appliance 102 to cook at least one available meal cartridge in the freezer portion 104. For example, after the user loads the freezer portion 104 of smart appliance 102 with at least one meal cartridge, the unique identifier associated with the meal cartridge may be detected and transmitted to computing server system 110 which in turn generates and transmits information representing the food and cartridge ID to the transceiver module 218 of the computing device 108. As a result, food options may be displayed or presented to the user via user interface 220, such that the user may select a meal choice now or later. In one embodiment, the user may make a meal choice via a $3^{rd}$ party linked smart home device such as Alexa, Siri, Microsoft services (e.g., Cortana) and Google services (e.g., Google Assistant), Samsung services (e.g., Bixby) and the like which may be configured to directly communicate with its corresponding server system. User interface 220 may interact with $3^{rd}$ party companies via application programming interface (API) synch or account linking. Moreover, based at least upon various information received via the transceiver module 218, a notification generation module 222 may be configured by processor 210 of computing device 108 to generate and transmit notifications to the user indicating the cooking status of a selected meal, and when the selected meal will be ready. Such notifications may be generated based on the dynamic cooking time.

As described above, computing server system 110 may be Cloud-based and configured to obtain, via e.g., a transceiver module 228 controlled by processor 226, identifying information of each and all meal cartridges (e.g., unique identifier associated with each meal cartridge) inserted into the freezer portion 104 of smart appliance 102. In response to receiving a meal choice selected by the user, cooking instruction command determination module 230 may be configured by processor 226 to query related databases for cooking duration and temperature of one or more selected meal cartridges. The user may choose to cook a particular selected meal cartridge using smart appliance 102 now or at a later time. In the former case, command determination module 230 may generate a signal to command the transfer mechanism controlling module 208 of smart appliance 102 to commence a food transfer from the freezer portion 104 to the oven portion 106 and set the oven portion 106 based on the cooking duration and temperature obtained from related databases with respect to the selected meal cartridge. Meanwhile, a notification generation module 232 may be configured by processor 226 to generate notifications to computing device 108 indicating the commencement of the cooking process and estimate of when the food will be ready. However, if the user indicates that she prefers the food to be ready at a later time, command determination module 230 may be configured to determine a food transfer time from the freezer portion 104 to the oven portion 106 and the cooking duration of the selected meal cartridge, and generate a signal to smart appliance 102 to commence the transfer and cooking process at a time taking into consideration the food transfer time and cooking duration, such that the food will be fully cooked by the user defined time. Similarly, notifications regarding the cooking status of the selected meal cartridge may be generated and transmitted by notification generation module 232 to user computing device 108. In one aspect, if the $3^{rd}$ party linked smart home service providers such as Alexa, Siri, and Google Assistant is used by the user, computing server system 110 may be configured to communicate with the corresponding $3^{rd}$ party server to indicate the cooking the status of the food, such that the user may be informed when the food is ready for consumption.

Memory 234 (similar to memory 214, 224), which is coupled to the processor 226, may be configured to store at least a portion of information obtained by computing server system 110 and data structures or instructions (e.g., software) embodying or utilized by at least one of the techniques or functions described herein.

Figure 3:
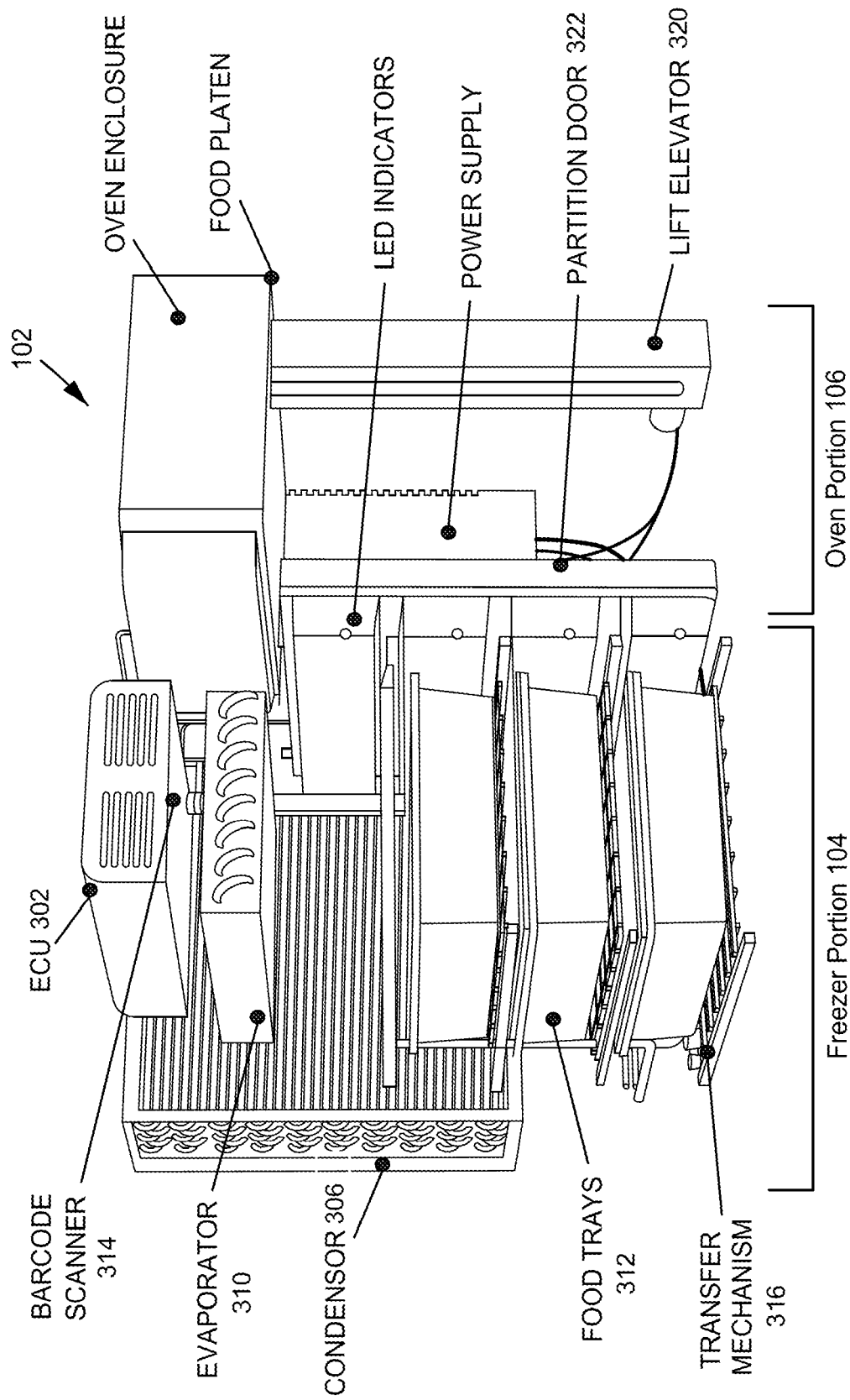
FIG. 3 illustrates a front view of the smart appliance of FIG. 1, according to an exemplary aspect.
Figure 4:
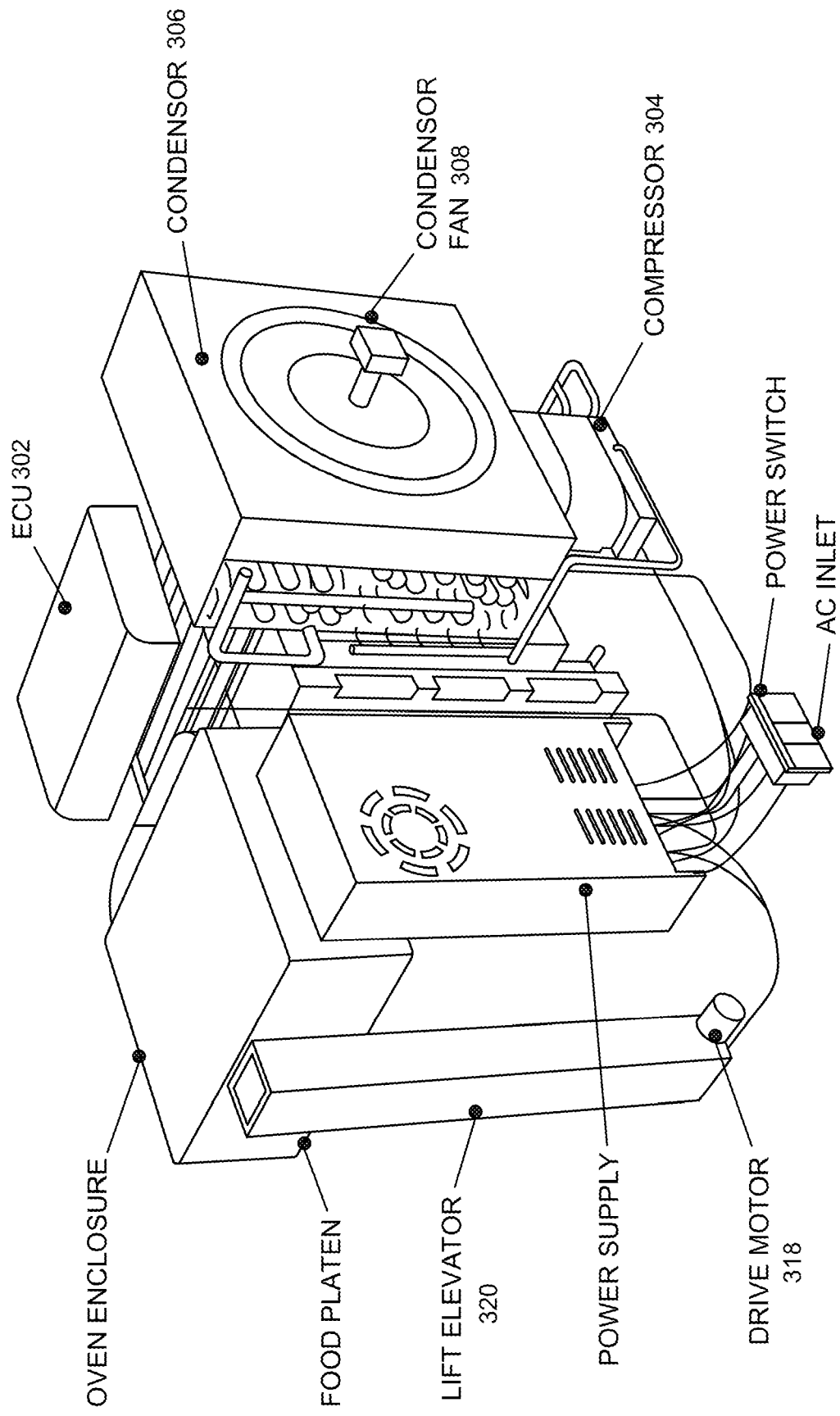
FIG. 4 illustrates a rear view of the smart appliance of FIG. 1, according to an exemplary aspect.

Referring now to FIGS. 3 and 4, diagrams outlining the internal components of smart appliance 102 are illustrated, according to aspects of the present disclosure. Specifically, the freezer portion 104 may be positioned in a first portion on one side (e.g., the left side when looking at the front of the appliance 102) within the housing of smart appliance 102 and use an electronic control unit (ECU) 302 to control a plurality of components comprising a compressor 304, a condenser 306, a convection fan 308, a Peltier unit, a radiator, and an evaporator 310 to preserve multiple shelves or trays 312 inserted and placed on multiple removable shelves at a selected temperature range. In one aspect, the ECU 302 may control the compressor 304 to compress a refrigerant, control the condenser 306 to convert highly compressed refrigerant from a gaseous state into a liquid state, and control the evaporator 310 to evaporate the refrigerant condensed by the condenser 306. The convection fan 308 may be configured to guide air through the condenser 306 thereby facilitating the transfer of the heat of compression from condenser coils to the ambient air and drawing air across the compressor 304 into the oven portion 106 and venting. A barcode scanner 314 such as a camera or RFID reader, or any suitable identifier detecting device, may be installed in an appropriate position of the freezer portion 104, such that each meal cartridge is identified via its unique identifier upon its insertion into the freezer portion 104.

In one embodiment, the smart appliance 102 may be configured to detect the presence or absence of a premade meal cartridge on any shelf or tray 312 of the freezer portion 104. For example, at least one proximity sensor, laser/optical sensor, or any suitable sensor may be implemented within the freezer portion 104 and controlled by processor 202 for monitoring the status of all shelves or trays 312 using electromagnetic field, light or sound. Alternatively, individual ultrasonic, infrared, weight, or physical button sensor may be installed on each shelf or tray 312 of the freezer portion 104 for detecting the presence or absence of a premade meal cartridge thereon.

Transfer mechanism 316 may involve either pushing or pulling each selected meal cartridge from the freezer portion 104 to oven portion 106 in response to a command input for cooking the selected meal cartridge. In one aspect, one or more motors 318 may be used and controlled by the ECU 302 to push each meal cartridge to an elevator tray of the oven portion 106 via a toothed belt and fingers. Alternatively, a meal cartridge may be pulled from the freezer portion 104 to oven portion 106. In one embodiment, the transfer mechanism 316 relating to the pulling may be attached to the elevator or located in the freezer portion 104.

Oven portion 106 may be positioned within the housing in a second portion of smart appliance 102 (e.g., the right side when looking at the front of the appliance 102) and may comprise an oven chamber. As shown in FIGS. 3 and 4, an oven chamber may be positioned above a lift elevator 320 but this positioning can be altered as described herein. The bottom of the oven chamber may be configured to move with the lift elevator 320 along a conveyor such as a slide rail. As described previously, the bottom of the oven chamber may be configured to stop at the freezer shelf height of a user selected meal cartridge in the freezer portion 104, accept the meal cartridge via the transfer mechanism, and move to seal the oven chamber. Oven heat source may be positioned remote to the oven chamber and hot air can be blown or sucked into the oven chamber during use. The oven portion 106 may also comprise a browning element situated over a cooked meal cartridge (e.g., 2 inches above) to keep it warm, while also allowing enough proximity to broil and/or brown the contents of a meal cartridge. Exhaust of the oven portion 106 may be blown or sucked out by a fan and directed away from the freezer portion 104. In some embodiments, freezer portion 104 is cooled using the compressor 304, wherein the heat generated by the compressor 304 is conveyed to the oven portion to maintain the oven portion 106 at a predetermined temperature and/or provide cooking heat. Lift elevator 320 of oven portion 106 may use a toothed belt and motor positioned to minimize the overall height of the elevator. Corner guides may be used to stabilize platform while the elevator moves vertically.

In one particular embodiment, the oven portion 106 of smart appliance 102 may be configured to include a number of sections designed for independently cooking different ingredients of a meal at different temperatures. For example, a first cooking section of the oven portion 106 may be configured to cook proteins, a second cooking section for pasta, rice, or grains, and a third cooking section for vegetables. In one aspect, each cooking section of the oven portion 106 may be controlled by processor 202 for temperature adjustment in accordance with the user's preference for doneness.

A partition between the freezer portion 104 and oven portion 106 may comprise a partition door 322, a slider, an accordion or roller-type door, flaps or a roller that may be movable when a selected meal cartridge is transferred therebetween. Some embodiments may comprise a dual door system that introduces an air gap between a first (e.g., cooling) portion and a second (e.g., oven) portion. In some embodiments, the appliance 102 may comprise dual doors with a gap between that can insulate one portion from another portion to allow a freezer portion to remain at a temperature lower than the temperature in a second (e.g., oven) portion. In one embodiment, separate access doors may be implemented for the freezer portion 104 and oven portion 106, such that a user may insert one or more meal cartridges into the freezer portion 104 and access cooked food from oven portion 106 through each respective door.

Smart appliance 102 may comprise a freezer, an oven, and a transfer mechanism. Although a small footprint is preferred, example external dimensions may be up to 18 inches wide by 12 inches deep by 15 inches high. Premade meal cartridges may be used and each package may have dimensions up to 7.5 inches wide by 6.5 inches deep 1.6 inches high. Meal cartridges may be either removed from their box or may not have a box prior to insertion into the freezer. Further, meal cartridges may not require the freezer portion 104 to open it, slice it open, or modify the meal cartridges in any way prior to cooking. It should be appreciated that various embodiments or configurations of shapes and sizes of the smart appliance 102 and the premade meal cartridges may be contemplated in accordance with aspects disclosed herein.

Smart appliance 102 may be configured to cook at least one meal at a time upon a user command. Alternatively, smart appliance 102 may be configured to support cooking multiple meal cartridges.

Smart appliance 102 may operate on the power provided by a standard U.S. kitchen outlet (e.g., 120 V, 15 Amps), though one of skill in the art would understand how to modify the device to use different (e.g., European) power standards. In one embodiment, smart appliance 102 may be controlled over Wi-Fi from an app or webpage, and configured to be insulated to prevent defrosting the stored meal cartridges while cooking.

Smart appliance 102 may have the following onboard human interfaces: visual indication that a meal cartridge is cooking; visual indication that a freezer shelf is empty; visual indication that a freezer shelf is occupied; visual indication of the network connectivity status such as active, down, connecting; a reset button of the appliance; a synch button of the appliance; visual indication of an error, along with push buttons to control the device; visual indication that the oven portion 106 of the smart appliance 102 is still hot and is cooling, or that a self-cleaning of the oven portion 106 is occurring.

Freezer portion 104 requirements: may have internal dimensions of 8 inches wide by 7 inches deep by 7 inches high; may support a "soft freeze" of 27° F.±3° F.; may support a defrost cycle to prevent frost build up on the interior of the freezer, may operate in a temperature range from about −10 degrees Fahrenheit to about 40 degrees Fahrenheit. When the temperature is set in a freezer portion or any individual shelf, the temperature may not fluctuate from its set-point more than ±2 degrees Fahrenheit. In some embodiments, that temperature fluctuation may be no more than ±0.5, ±1, ±2, ±3, ±4, ±5, ±10, degrees Fahrenheit and ranges therebetween. Freezer portion 104 may contain a camera or barcode reader on each shelf to read the unique identifier associated with each meal cartridge. In some embodiments, the freezer portion may comprise a single camera or barcode reader. In one embodiment, a pusher mechanism may be built into the shelves of the freezer portions 104.

Oven portion 106 requirements: may primarily cook using convection heat; may have the ability to brown/broil food using an infrared heating element; may preheat the oven chamber in less than 3 minutes; may keep a meal cartridge warm after cooking for up to 20 minutes if the user is unable to take the meal cartridge out immediately after completion of cooking. For example, the cooked meal cartridge may be in the transfer elevator shaft at this time, and the browning element may be used as a heat lamp.

The heating area of oven portion 106 may be safe up to 1000 degrees Fahrenheit (e.g., for self-cleaning). The average cooking temperature is between 300 and 550 degrees Fahrenheit. When the temperature is set, the temperature may not fluctuate from its set-point more than ±5 degrees Fahrenheit. In some embodiments, that temperature fluctuation may be no more than ±0.5, ±1, ±2, ±3, ±4, ±5, ±10, degrees Fahrenheit and ranges therebetween.

Oven portion 106 may contain a method of detecting a fire within the oven chamber such as a camera and software. Oven portion 106 may further comprise a fire suppression system to remove air (i.e., oxygen) from the oven portion, dispense water, dispense $CO_2$, dispense a fire suppressant material (e.g., salt) or the like. Some embodiments may comprise all of these and the appliance may be configured to determine and use the safest and/or least destructive option based on fire severity and food characteristics.

Transfer mechanism requirements: may support meal cartridges that weigh up to 32 ounces of food plus the container; and may utilize a transfer mechanism that can receive food from any shelf in the freezer and move it to the oven.

Onboard tech requirements: smart appliance 102 may connect to both 2.4 GHz and 5 GHz Wi-Fi in support of 802.11b/g/n/ac/ad standards (and the like); may contain at least 1 GB onboard storage; may support WPA/WPA2/WPA3 encryption standards; may connect to a Wi-Fi network as a client; may connect via Bluetooth; may connect via NFC; may broadcast a Wi-Fi network to act as an access point for initial configuration/provision; may continue performing its current cooking sequence during a network outage; may maintain meal cartridge count and state during a network outage; and may have an oscillator to maintain time during a network or power outage.

Figure 5:
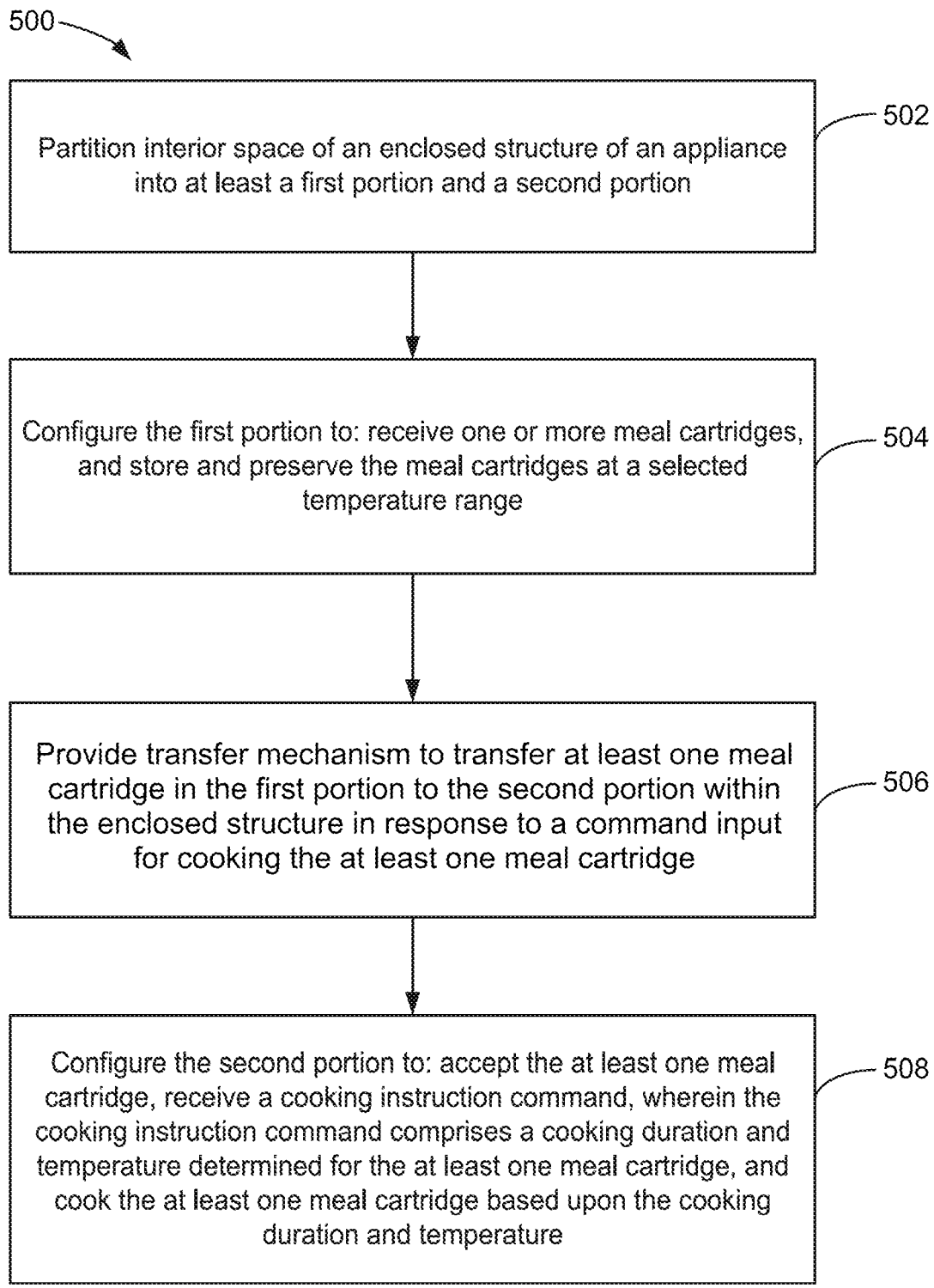
FIG. 5 illustrates a flow chart of a method implemented in the system of FIG. 1, according to an exemplary aspect.

Referring now to FIG. 5, a flow chart of a method 500 implemented in the system 100 of FIG. 1, is illustrated, according to aspects of the present disclosure. Among other things, the method comprises partitioning (502) interior space of an enclosed structure of an appliance into at least a first portion and a second portion; configuring (504) the first portion to: receive one or more meal cartridges, and store and preserve the meal cartridges at a selected temperature range; providing (506) transfer mechanism to transfer at least one meal cartridge in the first portion to the second portion within the enclosed structure in response to a command input for cooking the at least one meal cartridge; and configuring (508) the second portion to: accept the at least one meal cartridge, receive a cooking instruction command, wherein the cooking instruction command comprises a cooking duration and temperature determined for the at least one meal cartridge, and cook the at least one meal cartridge based upon the cooking duration and temperature.

As used herein, the terms "appliance," "smart appliance," and "system" may be used interchangeably. In some embodiments the "appliance" or "smart appliance" may be a sub-feature of the "system." One of skill in the art would immediately envisage the meaning of those terms in view of the context in which they are used.

Figure 6:
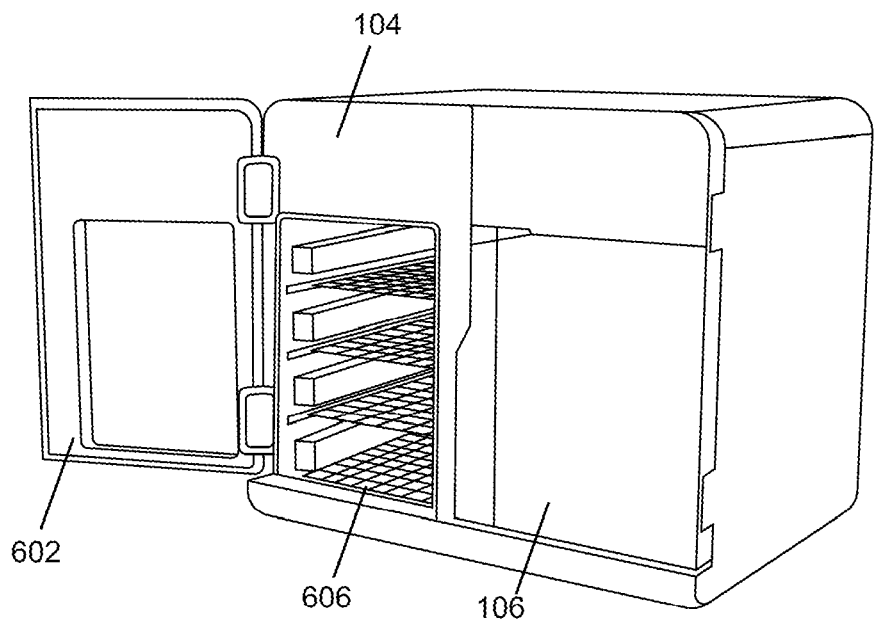
FIGS. 6-19 illustrate a general example of how the smart appliance of FIG. 1 stores, transfers, and cooks a premade meal cartridge, according to an exemplary aspect.
Figure 7:
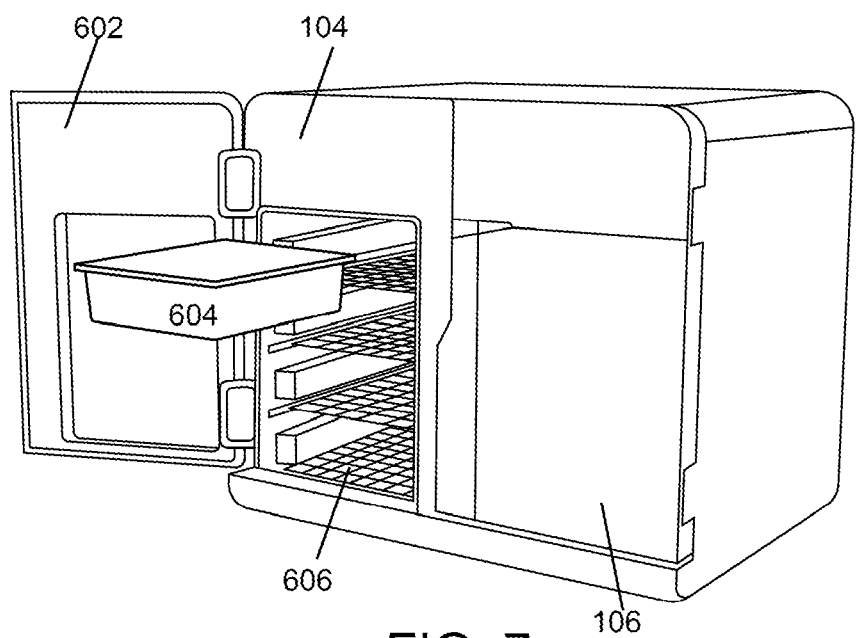
Figure 8:
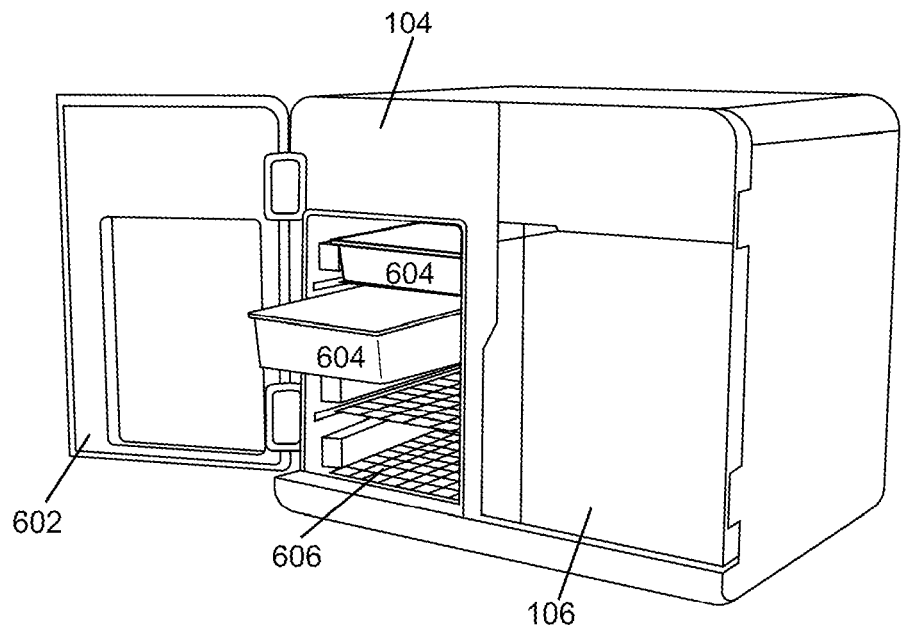
Figure 9:
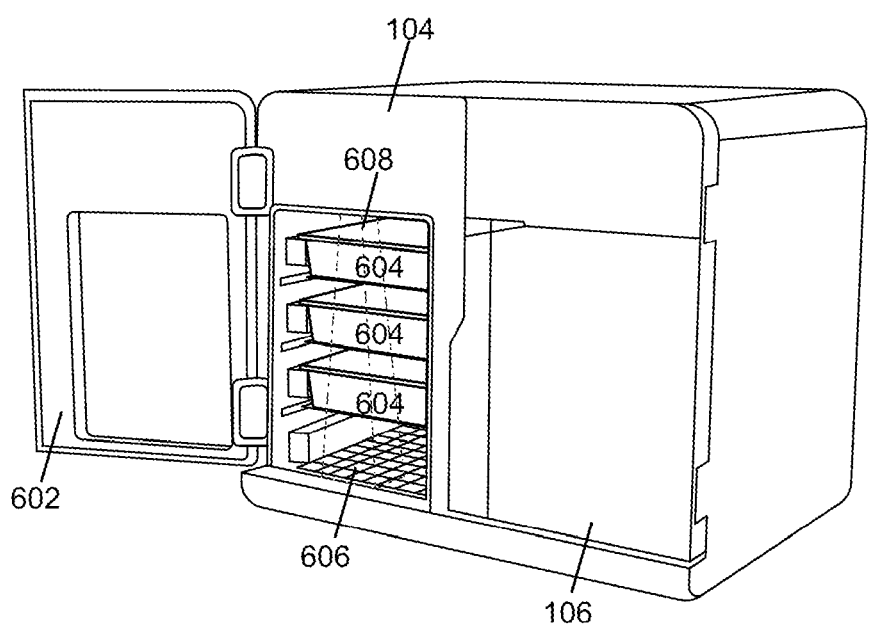
Figure 10:
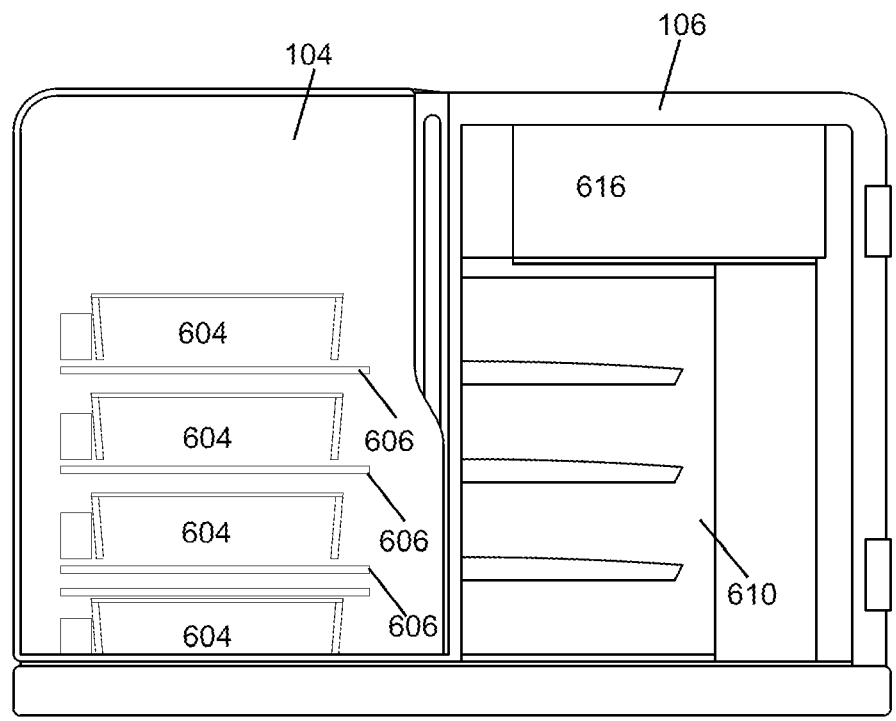
Figure 11:
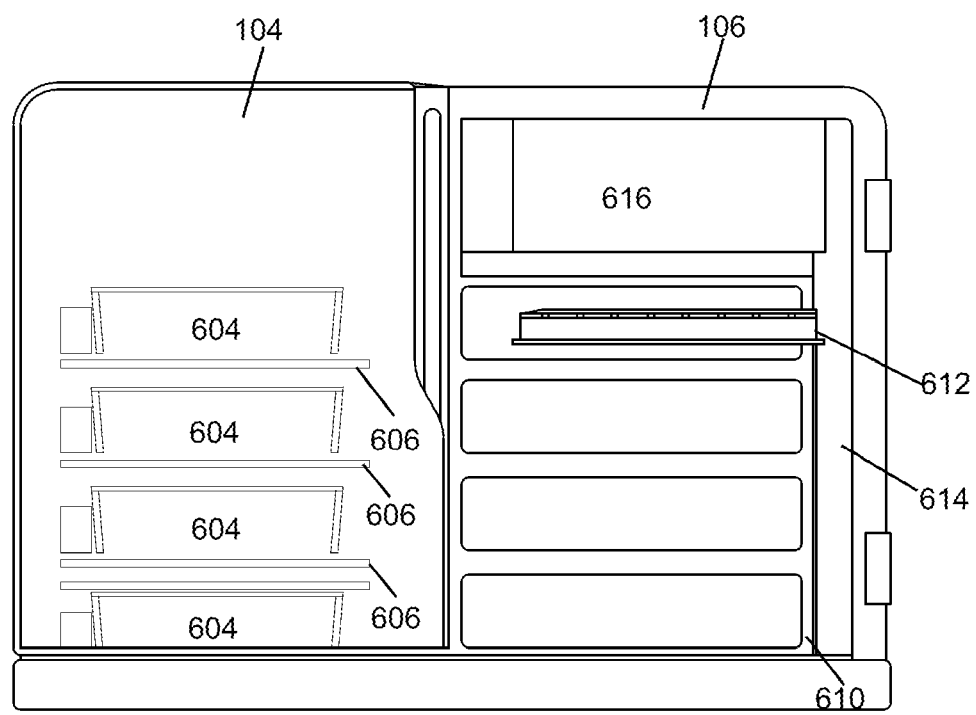
Figure 12:
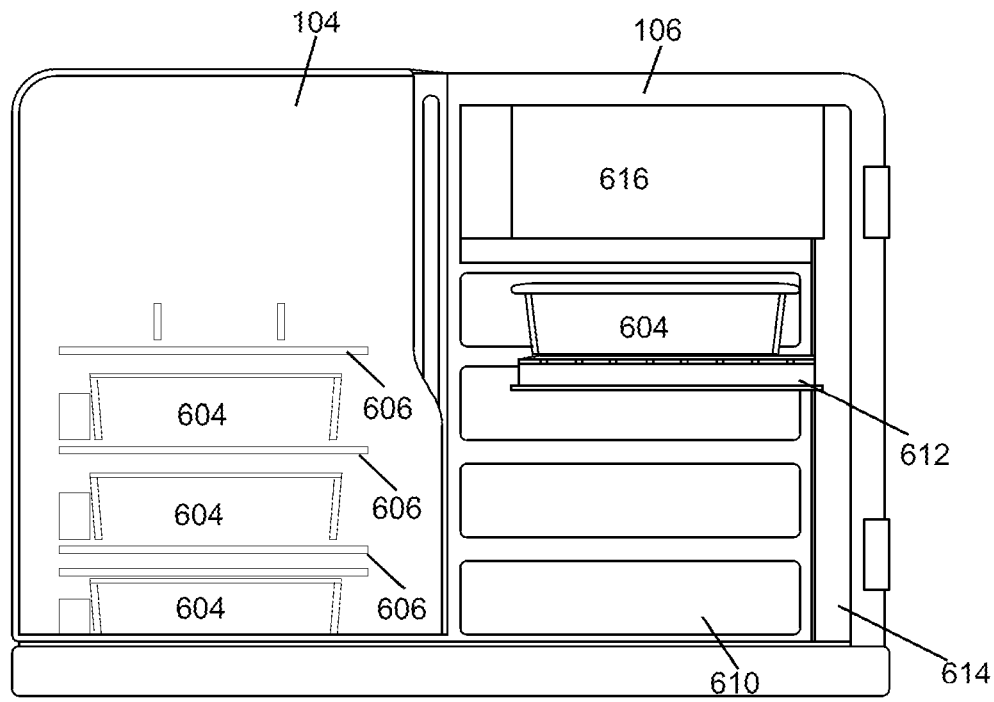
Figure 13:
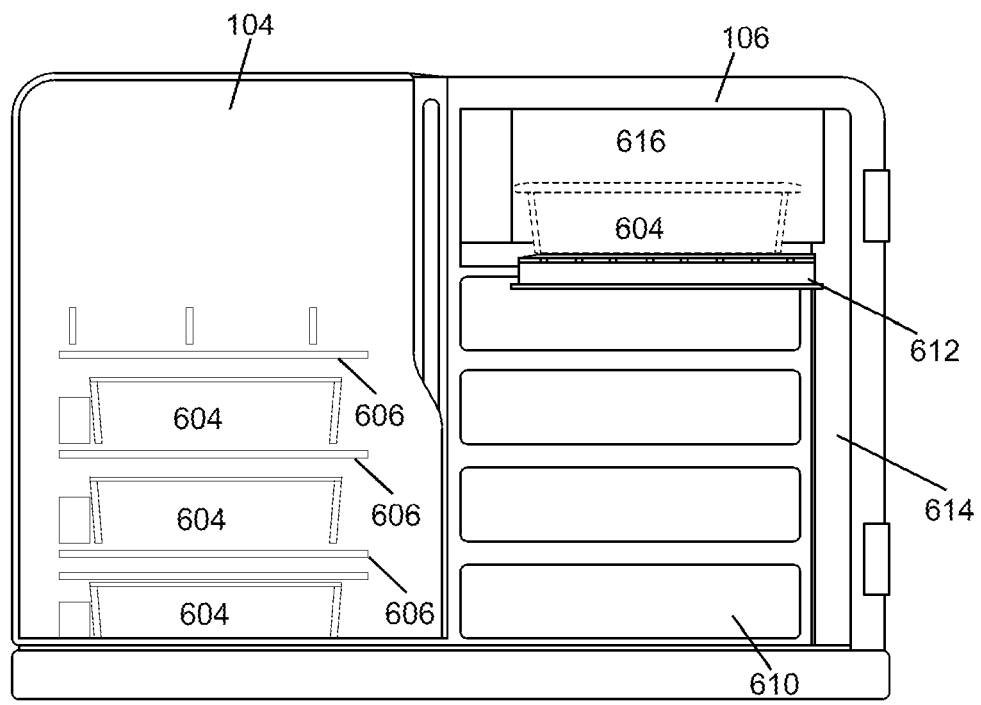
Figure 14:
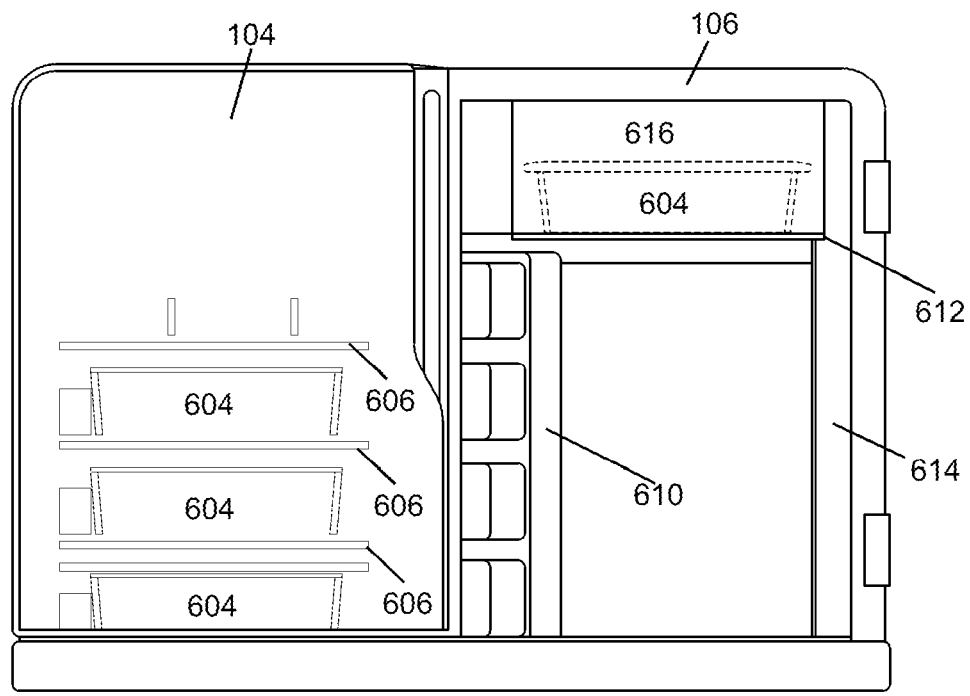

As an example, FIGS. 6-19 generally illustrate how the disclosed smart appliance 102 stores, transfers and cooks a premade meal cartridge using the freezer portion 104 and oven portion 106, according to aspects described above. As shown in FIGS. 6-8, the freezer portion 104 may include one or more doors 602 for a user to load one or more premade meal cartridges 604 on a number of shelves or trays 606 for storage during a meal planning and preparation phase, such that the freezer portion 104 may be configured to refrigerate (and/or freeze) and preserve the meal cartridge 604 at a selected temperature range. As shown in FIG. 9, the smart appliance 102 may be configured to detect the presence or absence of a premade meal cartridge 604 on any shelf or tray 606 of the freezer portion 104 via e.g., a unique identifier associated with each meal cartridge 604 and a camera or an RF ID tag or barcode reader device 608 implemented within the freezer portion 104. This may trigger an upload of food data to, e.g., connected cloud systems, as described above in connection with FIGS. 1 and 2. In some embodiments, the freezer portion 104 may be conjoined with the oven portion 106. In other embodiments, the freezer portion 104 and/or oven portion 106 may be retrofitted to an existing cold storage device and/or oven (or other suitable heating device).

Referring to FIGS. 10-14, in response to receiving a cooking instruction command, smart appliance 102 may be configured to transfer one or more meal cartridges 604 from freezer portion 104 to oven portion 106. For example, a door 610 between the freezer portion 104 and oven portion 106 may be opened to allow one or more meal cartridges 604 to be pushed or pulled from its shelf or tray 606 onto an elevator tray 612 that moves along an elevator shaft 614 and forms the bottom of an oven enclosure 616 of the oven portion 106 (i.e., the door serving as a pusher or puller depending on its configuration here). A transfer mechanism can push or pull a meal cartridge using a conveyer, a mechanical mover such as a hooked apparatus or a rod that can push or pull the meal cartridge. The configuration of the transfer mechanism is not particularly limited and is configured to be able to move and transfer a meal cartridge and such working configurations would be understood by the skilled artisan in view of the description contained herein. Thereafter, the elevator tray 612 moves to seal the oven enclosure 616 with meal cartridge 604 to be cooked in the oven portion 106. In the meantime, door 610 may be closed for separating and insulating the freezer portion 104 from the oven portion 106.

Figure 15:
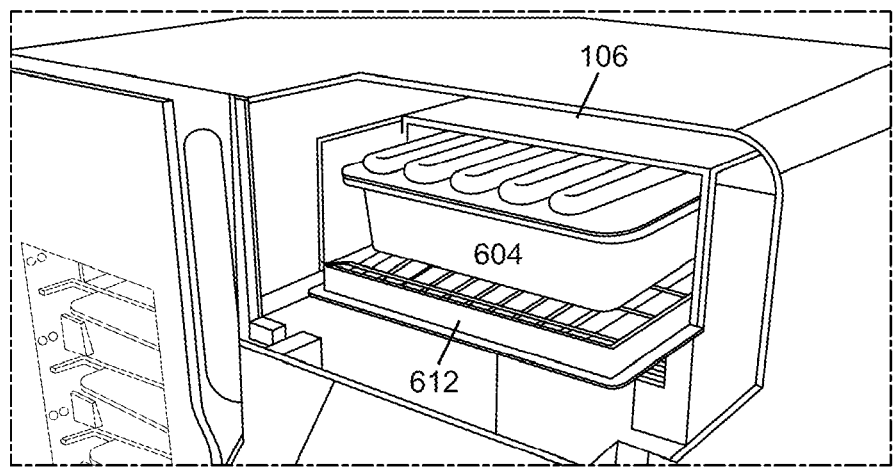
Figure 16:
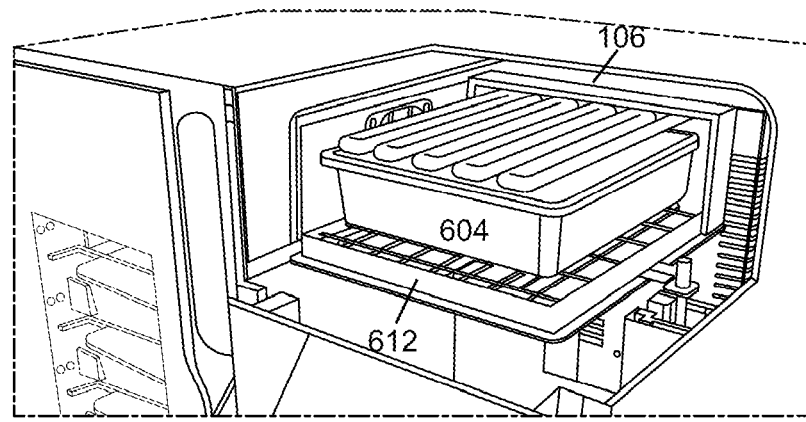
Figure 17:
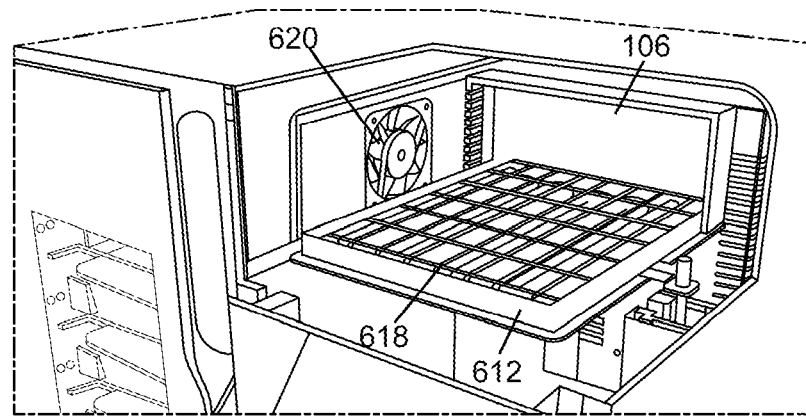

The cutaway views shown in FIGS. 15-17 illustrate how the oven portion 106 is configured to cook meal cartridge 604 inside the oven enclosure 616, according to aspects described above. For example, the oven portion 106 may comprise an oven configured to heat up to about 1000 degrees Fahrenheit, and a browning element configured to warm, cook, broil, and/or sear a cooked meal cartridge 604 that has not been taken out by the user immediately for consumption. As shown in FIG. 17, the oven portion 106 may contain a heating element 618 and a convection fan 620 configured to circulate air and heat food more evenly. The oven portion 106 may be configured to cook the meal cartridge 604 at a predetermined temperature for an amount of time specified by the food manufacturer or the user. For example, the received cooking instruction command may comprise data such as temperature and cooking time. Cooking instruction may also be obtained by the smart appliance 102 via receiving a user input or scanning a food item. For example, this data may be obtained during the loading phase of meal cartridges into the freezer portion 104 via a barcode scan. The oven portion 106 may also preheat and cool down very quickly. The cool down phase may be facilitated by the cold air from the freezer portion 104, which also ensures that the oven portion 106 is not too hot for the user to touch or handle.

Figure 18:
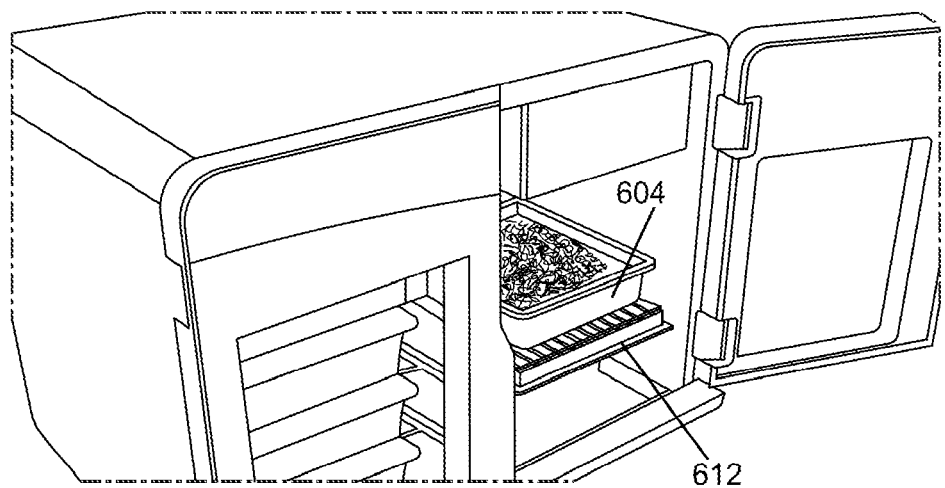
Figure 19:
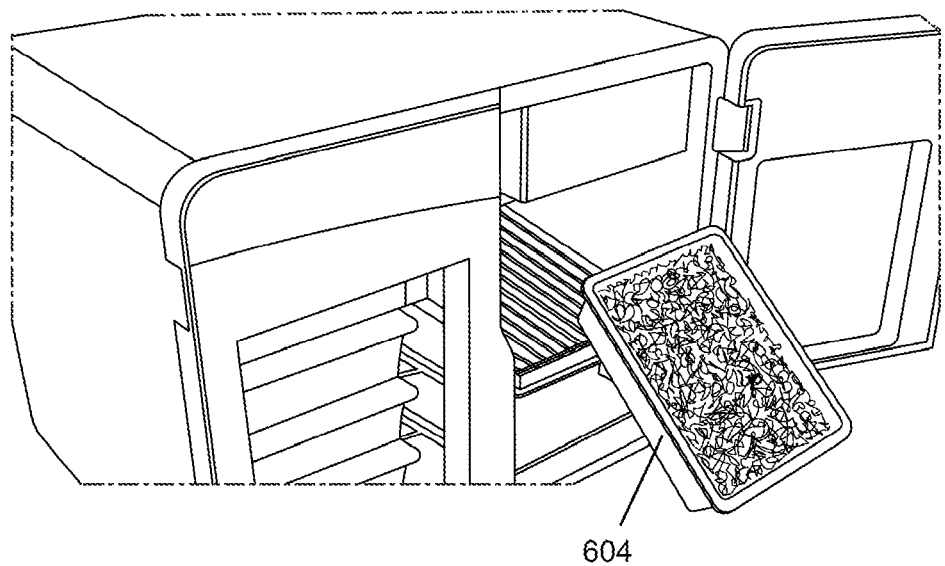

As shown in FIGS. 18 and 19, meal cartridge 604, which has been fully cooked in accordance with its corresponding cooking instruction, may be configured for retrieval and consumption by the user. In one embodiment, the elevator tray 612 may be configured to open oven enclosure 616 and move downward along the elevator shaft 614, such that meal cartridge 604 may be retrieved by the user.

The smart appliance 102 of the present disclosure may be configured to automatically transition food from a frozen state in the freezer portion 104 to a cooking state in the oven portion 106 without human intervention. As disclosed above in connection with FIGS. 1 and 2, smart appliance 102 may have the following features: connection to local wireless LAN; integration with a cloud system configured to keep track of the state of the appliance at all times including food stored in the freezer and food in the pre/cooking/cooked state; knowledge of cooking times based on the scanned food item; user control via at least one smartphone application or equivalent device capable of communicating with the appliance; integration with other smart home services including, but not limited to, Alexa, Siri, and Google Assistant; and knowledge and timing of real world events.

For clarity purposes, not all of the features of the aspects are disclosed herein. One of skill in the art would appreciate that in the development of any actual implementation of the present disclosure, numerous implementation-specific decisions can be made in order to achieve the developer's specific goals, and these specific goals will vary for different implementations and different developers, along with different user preferences. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by those skilled in the art in light of the teachings and guidance presented herein, in combination with the knowledge of the skill in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A smart appliance, the smart appliance comprising:
a first portion comprising a freezer portion and a Peltier unit;
wherein the freezer portion comprises a plurality of removable shelves and is configured to receive and store one or more meal cartridges on any removable shelf of the plurality of removable shelves;
wherein each of the one or more meal cartridges comprise a unique identifier, and the freezer portion includes a detector configured to read the unique identifier on each of the one or more meal cartridges upon its insertion into the freezer portion and upload food data contained in the unique identifier to a computing server system;
a second portion comprising an oven;
a partition between the first portion and the second portion that opens to allow the transfer of the one or more meal cartridges from the first portion to the second portion;

wherein the second portion is configured to: accept the one or more meal cartridges, after receiving a cooking instruction command that is associated with the unique identifier on any of the one or more meal cartridges and wherein the cooking instruction command comprises a cooking duration and a cooking temperature determined for the one or more meal cartridges, and the second portion is configured to cook the one or more meal cartridges based upon the cooking duration and temperature.

2. The smart appliance of claim 1, wherein the computing server system is a cloud-based communication network.

3. The smart appliance of claim 1, wherein the second portion comprises a built-in thermometer.

4. The smart appliance of claim 1, wherein the second portion comprises one or more sensors.

5. The smart appliance of claim 1, further comprising one or more sensors configured to detect a cooking status of the one or more meal cartridges in the second portion.

6. The smart appliance of claim 1, further comprising one or more sensors configured to detect a presence or absence of the one or more meal cartridges on any removable shelf of the plurality of removable shelves.

7. The smart appliance of claim 1, further comprising one or more sensors configured to detect an indication of a network connectivity status or an operating status of the device.

8. The smart appliance of claim 1, further comprising one or more of a pressure cooker, slow cooker, infrared cooker, oil fryer, a microwave, a steam oven, a sous vide, a smoker, and an air fryer.

9. The smart appliance of claim 1, further comprising an electronic control unit.

10. The smart appliance of claim 1, further comprising a compressor.

11. The smart appliance of claim 1, further comprising a convection fan.

12. The smart appliance of claim 1, further comprising a radiator.

13. The smart appliance of claim 1, further comprising a browning element.

14. The smart appliance of claim 1, wherein freezer portion maintains a temperature of about −10 degrees Fahrenheit to about 40 degrees Fahrenheit.

15. The smart appliance of claim 1, wherein the oven is configured to heat up to about 1000 degrees Fahrenheit.

* * * * *